March 28, 1967     A. R. THOMPSON     3,311,920

DIRECT WRITING INSTRUMENT

Filed May 6, 1965

*INVENTOR.*
ALLAN R. THOMPSON

BY

*Elbert J. Hyde*
ATTORNEY

United States Patent Office 3,311,920
Patented Mar. 28, 1967

3,311,920
DIRECT WRITING INSTRUMENT
Allan R. Thompson, Westlake, Ohio, assignor to Clevite Corporation, a corporation of Ohio
Filed May 6, 1965, Ser. No. 453,796
9 Claims. (Cl. 346—140)

This invention pertains to a direct writing instrument of the type adapted to be swung from side to side while writing on a moving record chart, and while it is particularly applicable to a pen for writing with fluid on paper, it is not limited thereto.

The writing instrument of the present invention is particularly adapted to a system of the type shown and described in United States patent application Ser. No. 449,729, filed about Apr. 21, 1965, in the names of Maurice S. Hartley, Allan R. Thompson, and Frank P. Zaffarano, for Multichannel Direct Writing Oscillograph and Record Member Therefor, and assigned to the same assignee as the present invention.

In order to achieve accurate writing under high acceleration forces, the pen must be as rigid as possible in a direction parallel to the plane of the record chart, and in order to be able to write at high frequencies, the pen must be as light as possible. Further, in order for the pen to be closely coupled to the paper to seal the ink at the pen tip, a substantial downward bias must be applied to the pen tip through the body of the pen. Thus, the body of the pen must have a higher degree of stiffness in a direction normal to the record chart than has heretofore been necessary. Another desirable aspect of the pen which complicates its design is the fact that it is adapted to record a trace which is up to 80 mm. wide, and this dictates a pen which has considerable length from pivot point to pen tip.

It is an object of the present invention to provide a direct writing instrument such as a light weight inking pen which is to undergo high lateral acceleration forces, yet which is stiff in a plane parallel to the record chart and is reasonably stiff in a direction normal thereto.

For a better understanding of the present invention, together with other and further objects thereof, reference is had to the following description taken in connection with the accompanying drawings, and its scope will be pointed out in the appended claims.

With reference to the drawings there is shown in FIGURE 1 a side view of the writing instrument.

An aspect of the invention lies in the provision of a direct writing instrument which is adapted to be swung from side to side in a rotary motion under high acceleration forces while being closely coupled to a moving record chart to write thereon. The writing instrument, or pen, is comprised of a supporting member or tube which extends axially lengthwise of the pen, terminating at its front end in a writing tip and at its rear end being adapted to be connected to a source of fluid ink, electricity, or some other type of writing energy. A hub member is connected to the supporting member adjacent its rear end and it has a web securing portion which extends transverse to the supporting member terminating in outer ends. The hub member also includes a securing portion adapted to be connected to driving means for rotating or swinging the tip of the pen in accordance with signals to be recorded on the record chart. A sheet-like web member of aluminum, or the like, which is narrow at the writing tip end and broader at the rear end, is secured to said supporting member adjacent the writing tip end and is likewise secured to the web securing portion of the hub member at its rear end. Stiffening members are connected to the edges of the web member and they taper inwardly toward each other from location adjacent the outer ends of the hub member toward the writing tip for stiffening the web member.

Figure 1:
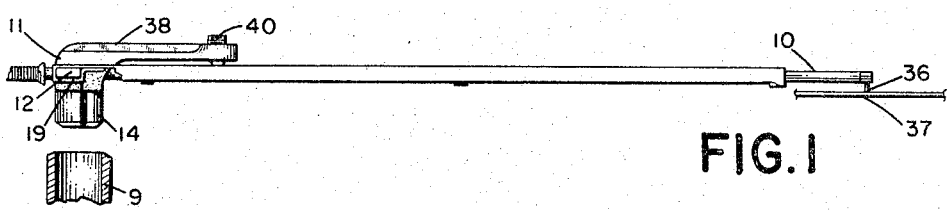
Figure 2:
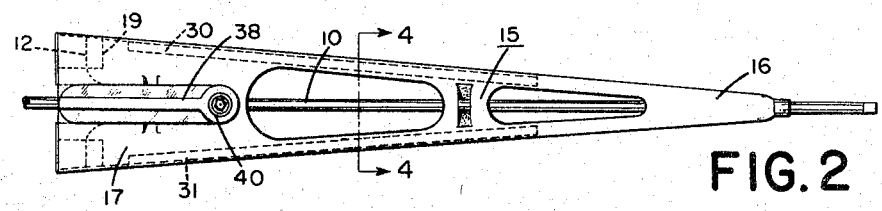
FIGURE 2 is a top view of the instrument and FIGURE 3 is a bottom view thereof.
Figure 3:
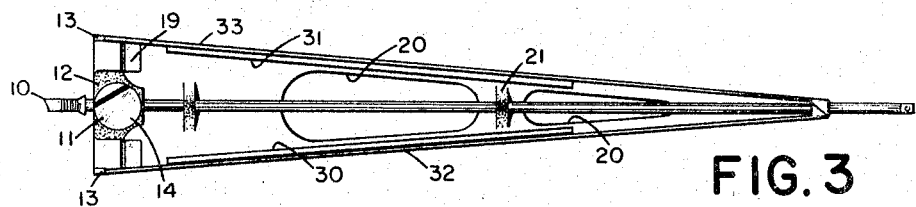

With reference to the drawing, there is shown in FIGURES 1 to 3 a writing instrument embodying the invention, and formed of a tubular supporting member 10 which extends the length of the pen, forming the backbone thereof. Tube 10 preferably is formed of inconel, and may be about .050" in diameter with a wall thickness about .003". The supporting member 10 is connected to and extends through a hub member 11 which includes a transversely extending web securing portion 12 terminating in outer ends 13, and a shaft 14 adapted to be connected to a driving motor 9 for rotating or swinging the instrument. The hub preferably is formed of magnesium for strength with light weight.

Figure 5:
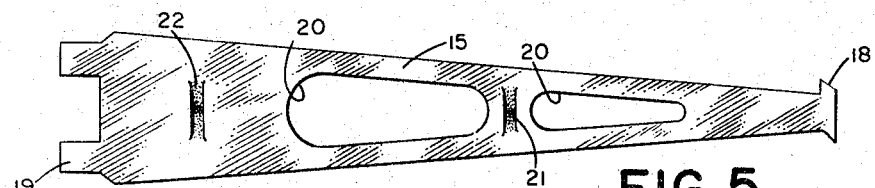
FIGURE 5 is a plan view of the web portion of the instrument.
Figure 4:
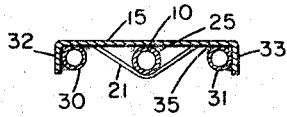
FIGURE 4 is a sectional view taken along line 4—4 of FIGURE 2.
Figure 7:
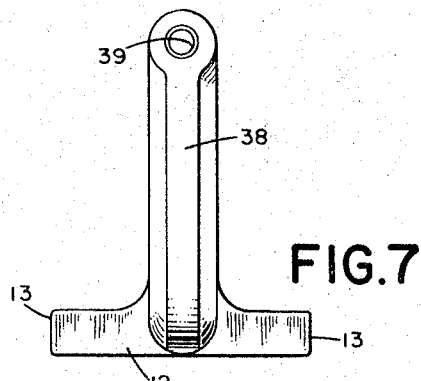
FIGURES 7 and 8 are top and end views, respectively, of the hub shown in FIGURE 6.
Figure 6:
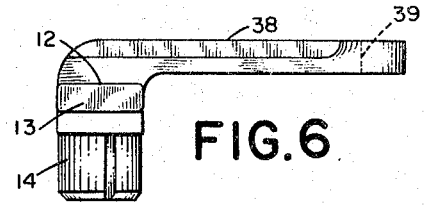
FIGURE 6 is a side view of the hub of the instrument.
Figure 8:
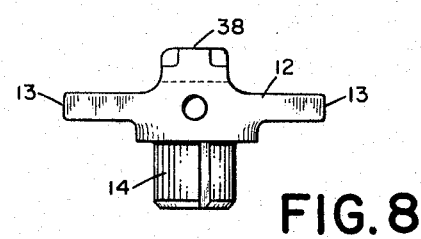

A sheet-like web member 15, which is narrow at the forward or writing tip end 16 and broader at the rear end 17, is secured to the supporting member 10 at a plurality of locations. FIGURE 5 shows the web member 15 in its flattened or unassembled condition. It includes tabs 18 at its forward end and tabs 19 at its rearward end. Intermediate the ends are two cut-away areas 20 to reduce the mass of the web, and two slotted sections forming connecting bands 21 and 22. The web 15 preferably is formed of thin gage aluminum about .005" thick, and it is secured to the supporting member 10 at the forward end by wrapping tabs 18 around it and soldering it thereto, and at two intermediate locations by bands 21 and 22, and at the rear end by tabs 19 which fold tightly around the transverse portions 12 of the hub member 11. The tabs 19 may be soldered or otherwise adhered to the hub, or they may merely be folded tightly against it. As is shown in FIGURES 2, 3 and 4, the tubular supporting member 10 extends between the bands 21, 22 and the main surface of the web 15, where it may be soldered or otherwise adhered to both the band and the web by material 25.

Stiffening members such as aluminum tubes 30, 31 are connected to downwardly turned edges 32, 33 of the web member 15 by solder or adhesive material 35, and they taper from adjacent the outer ends 13 of the hub member inwardly toward a tubular writing tip 36 which connects to the interior of tube 10 for ink flow to the surface of the record chart.

The pen of the present invention is particularly adapted for use in a system wherein the ink is under pressure for positive, adequate feeding to the pen tip 36 under all writing conditions.

In order to prevent leakage of ink at the pen tip 36 and the record member 37, a much stronger downward bias is applied between the tip and the paper than has previously been used in non-pressurized systems. In order to establish this bias, the shaft 14 is tightly connected into a driving motor shaft 9 by set screws or the like, not shown, and a forwardly extending arm section 38 of the hub is provided. Thus, the integral hub includes the shaft 14 for engagement with the motor drive device 9, outwardly extending web engaging portions 12, and the forwardly extending bias establishing arm 38. The forward portion of the arm 38 is threaded at 39 to receive a set screw 40.

When the device is assembled, as shown in FIGURES 1 and 2, the lower end of the set screw 40 bears against the aluminum web 15 and directly underneath the area of engagement is the supporting member 10. Thus, by turning the set screw 40, the amount of bias between the pen tip 36 and the paper 37 can be changed.

The aforedescribed pen, due to its structure, is very stiff in a plane parallel to the record chart; i.e. in the plane of the major face of the web member. It has no mechanical resonances below about 1 kc.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A direct writing instrument of the type adapted to be swung from side to side while writing on a moving record chart, comprising in combination; a supporting member extending axially lengthwise of said writing instrument terminating at its front end in a writing tip and at its rear end being adapted to be connected to an external source of writing energy, a hub member connected to said supporting member adjacent its rear end and having a web securing portion extending transverse to said supporting member terminating in outer ends and having a shaft portion adapted to be connected to driving means for rotating or swinging said instrument, a sheet-like web member narrow at said writing tip end and broader at said rear end secured to said supporting member adjacent said writing tip end thereof and secured to said web securing portion of said hub member at its rear end, and stiffening members connected to the edges of the said web member and tapering from adjacent the said outer ends of said hub member inwardly toward said writing tip for stiffening said web member.

2. A direct writing instrument as set forth in claim 1, further characterized by said writing instrument being an ink writing pen, said supporting member comprising a hollow tubular member connected at its rear end to a source of ink and connected at its other end to an ink writing tip.

3. A direct writing instrument as set forth in claim 2, further characterized by said stiffening members comprising hollow tubes.

4. A direct writing instrument as set forth in claim 3, further characterized by said hub member having a central adjusting portion overlying said axially extending supporting member, and a set screw in threaded engagement with said central adjusting portion and in force transmitting engagement with said supporting member to bias the writing tip against the record chart.

5. A direct writing instrument as set forth in claim 4, further characterized by said web member having at least one opening located between said stiffening members.

6. A direct writing instrument as set forth in claim 4, further characterized by said web member having a pair of parallel, spaced-apart slits extending transversely to said supporting member forming a strap portion each end of which is integral with said web, said supporting member extending between said web and said strap portion forming a truss to stiffen said pen.

7. A direct writing instrument as set forth in claim 6, further characterized by said strap portion being located between two of said openings in said web member.

8. A direct writing instrument as set forth in claim 7, further characterized by there being two of said strap portions in said web member, one located adjacent said hub member and the other spaced therefrom toward the pen tip.

9. A direct writing instrument as set forth in claim 8, further characterized by said central adjusting portion of said hub member extending from the rear end of said supporting member toward said pen tip and said set screw being located forward of said hub securing portion.

References Cited by the Examiner

UNITED STATES PATENTS

| | | | |
|---|---|---|---|
| 613,811 | 11/1898 | Wolfe | 346—140 |
| 2,746,835 | 5/1956 | Grass | 346—140 |
| 3,163,491 | 12/1964 | Daigler | 346—140 |

RICHARD B. WILKINSON, *Primary Examiner.*

J. W. HARTARY, *Assistant Examiner.*